(12) United States Patent
Roffey (10) Patent No.: US 10,427,870 B1
(45) Date of Patent: Oct. 1, 2019

(54) WASTE RECEPTACLE HOLDING DEVICE

(71) Applicant: Nigel Roffey, Lakeworth, FL (US)

(72) Inventor: Nigel Roffey, Lakeworth, FL (US)

( * ) Notice: Subject to any disclaimer, the term of this patent is extended or adjusted under 35 U.S.C. 154(b) by 0 days.

(21) Appl. No.: 15/854,857

(22) Filed: Dec. 27, 2017

Related U.S. Application Data (60) Provisional application No. 62/534,730, filed on Jul. 20, 2017.

(51) Int. Cl.
*B65F 1/14* (2006.01)
*A01D 7/10* (2006.01)
*B65B 67/12* (2006.01)

(52) U.S. Cl.
CPC ............... *B65F 1/1415* (2013.01); *A01D 7/10* (2013.01); *B65B 67/1233* (2013.01); *B65F 2240/138* (2013.01)

(58) Field of Classification Search
CPC .... A01B 1/10; B65F 1/1415; B65F 2240/138; A01K 23/00; A01K 23/005; A01D 7/10
USPC .......................... D30/162; 56/400.06, 400.11
See application file for complete search history.

(56) References Cited

U.S. PATENT DOCUMENTS

| | | | | |
|---|---|---|---|---|
| 2,421,740 A * | 6/1947 | Birch, Jr. | ................ | B65B 67/12 248/101 |
| 2,462,973 A * | 3/1949 | Kelrick | ................... | B65B 67/12 24/343 |
| 3,242,513 A * | 3/1966 | Janke | ...................... | A01B 1/20 7/116 |
| 3,297,862 A * | 1/1967 | Levy | ...................... | B42D 5/007 362/99 |
| 3,562,840 A * | 2/1971 | Meszaros | ................ | A47L 13/52 15/257.4 |
| 3,827,098 A * | 8/1974 | Sanderson | ............ | E01H 1/1206 294/1.4 |
| 4,021,994 A * | 5/1977 | Mainprice | ........... | B65B 67/1238 248/101 |
| 4,236,741 A * | 12/1980 | Emme | ................... | A01K 23/005 294/1.5 |
| 4,262,948 A * | 4/1981 | Emme | ................... | A01K 23/005 294/1.5 |
| 4,457,549 A | 7/1984 | Lowery | | |
| D285,012 S * | 8/1986 | Willis | ............................ | 294/1.4 |
| 4,628,572 A * | 12/1986 | Chang | ....................... | B42F 1/00 24/67 R |
| 4,852,924 A * | 8/1989 | Ines | ...................... | A01K 23/005 294/1.5 |
| 4,955,566 A * | 9/1990 | Bolich | ................ | B65B 67/1222 248/101 |
| 4,958,871 A * | 9/1990 | Hemans | ................ | E01H 1/1206 15/257.1 |

(Continued)

FOREIGN PATENT DOCUMENTS

GB       2416110 A  *  1/2006  ........... A01K 23/005

*Primary Examiner* — Thomas B Will
*Assistant Examiner* — Joan D Misa
(74) *Attorney, Agent, or Firm* — Cramer Patent & Design, PLLC; Aaron R. Cramer (57) ABSTRACT

A waste receptacle holding device provides a handle being attached to a pair of hoops which engage each other to entrap a waste bag in between. The waste bag is then used to collect yard debris such as grass, leaves, and twigs while a user grasps the handle. An additional embodiment of the waste receptacle provides a rake head which may be removably attached to a top end of the handle to enable a user to perform a raking task when desired.

10 Claims, 6 Drawing Sheets

(56) References Cited

U.S. PATENT DOCUMENTS

| | | | | |
|---|---|---|---|---|
| 4,979,623 A * | 12/1990 | Flanagan | A01B 1/20 | 209/419 |
| 5,025,621 A * | 6/1991 | DeMarco | A01D 11/06 | 56/400.05 |
| 5,031,948 A | 7/1991 | Groth et al. | | |
| D333,888 S * | 3/1993 | Visser | 294/1.4 | |
| 5,226,215 A * | 7/1993 | Evenson | B43L 5/02 | 24/67.11 |
| 5,269,575 A * | 12/1993 | Parvaresh | A01K 23/005 | 294/1.5 |
| 5,413,394 A | 5/1995 | Mitchell | | |
| 5,588,622 A * | 12/1996 | Gordon, Sr. | B65B 67/1238 | 24/30.5 R |
| 5,676,411 A * | 10/1997 | Kwok | A01K 23/005 | 294/1.5 |
| 5,779,290 A * | 7/1998 | Wilke | A01K 23/005 | 294/1.5 |
| 5,836,553 A * | 11/1998 | Bergaila | B65B 67/1233 | 248/99 |
| 5,997,061 A | 12/1999 | Langley | | |
| 6,149,214 A * | 11/2000 | Kipka | A01K 23/005 | 294/1.5 |
| 6,164,710 A * | 12/2000 | Shibuya | A01K 23/005 | 15/257.3 |
| 6,386,606 B1 | 5/2002 | Marshall | | |
| 6,416,023 B1 * | 7/2002 | Satsky | B65B 67/12 | 248/99 |
| 6,478,351 B1 * | 11/2002 | Nelson | E01H 1/1206 | 15/257.2 |
| 6,517,034 B1 * | 2/2003 | Kinchen | B65B 67/1238 | 248/100 |
| 6,641,187 B2 | 11/2003 | Hsu | | |
| 6,702,349 B2 * | 3/2004 | Clements | A01K 23/005 | 294/1.5 |
| 6,942,264 B1 * | 9/2005 | Mendez | A01K 23/005 | 294/1.5 |
| 7,011,278 B1 | 3/2006 | Baldwin, III | | |
| 7,090,268 B2 * | 8/2006 | Borman | A01K 23/005 | 294/1.5 |
| 7,267,381 B2 * | 9/2007 | Cafferty | A01K 23/005 | 294/1.5 |
| D563,778 S * | 3/2008 | Weinacker, Jr. | D8/394 | |
| D613,915 S * | 4/2010 | Plotkin | D30/162 | |
| 7,703,822 B1 * | 4/2010 | Giacalone | A01D 7/10 | 294/50.8 |
| 8,123,266 B1 * | 2/2012 | Jone | A01K 23/005 | 294/1.4 |
| 8,177,270 B2 * | 5/2012 | Chen | A01K 23/005 | 294/1.4 |
| 8,267,358 B1 * | 9/2012 | Letson | B65B 67/1238 | 248/101 |
| 8,337,372 B1 * | 12/2012 | Boterenbrood | A01B 1/02 | 294/49 |
| 8,544,907 B2 * | 10/2013 | Powell | A01K 23/005 | 294/1.5 |
| D696,822 S * | 12/2013 | Pearcey | D30/161 | |
| 8,777,283 B2 * | 7/2014 | McNair | E01H 1/1206 | 294/1.4 |
| 8,827,334 B2 * | 9/2014 | Endara | E01H 1/1206 | 15/257.2 |
| 9,067,700 B1 * | 6/2015 | Middleton | B65B 67/1233 | |
| D763,520 S * | 8/2016 | Runyan | D30/162 | |
| 9,420,762 B2 * | 8/2016 | Brasuel | A01K 23/005 | |
| 9,609,849 B1 * | 4/2017 | Hyman, Jr. | A01K 23/005 | |
| D791,417 S * | 7/2017 | Le | D30/161 | |
| 9,854,787 B1 * | 1/2018 | Hayes | A01K 23/005 | |
| D810,366 S * | 2/2018 | Alonso Sanchez | D30/162 | |
| D811,023 S * | 2/2018 | Baker | D30/162 | |
| 2003/0033793 A1 * | 2/2003 | Fairbanks | A01D 7/10 | 56/400.1 |
| 2006/0001281 A1 | 1/2006 | Hubert | | |
| 2006/0191542 A1 | 8/2006 | Dillon | | |
| 2009/0045639 A1 * | 2/2009 | Shalhoub | A01K 23/005 | 294/1.5 |
| 2010/0013252 A1 * | 1/2010 | Hopp | A01B 1/20 | 294/50.8 |
| 2010/0140423 A1 * | 6/2010 | Davies | B65F 1/1415 | 248/101 |
| 2010/0163691 A1 | 7/2010 | Peterson | | |
| 2010/0236210 A1 * | 9/2010 | Compton | A01B 1/20 | 56/400.11 |
| 2011/0023443 A1 * | 2/2011 | Hatfield | A01D 7/10 | 56/400.11 |
| 2012/0234989 A1 * | 9/2012 | Perlman | B65B 67/1233 | 248/101 |
| 2014/0150397 A1 * | 6/2014 | Palmer | B65B 67/1238 | 56/400.11 |
| 2015/0216119 A1 * | 8/2015 | Squires | A01D 7/10 | 56/400.04 |
| 2018/0092282 A1 * | 4/2018 | Gibb | A01B 1/20 | |

* cited by examiner

WASTE RECEPTACLE HOLDING DEVICE

RELATED APPLICATIONS

The present invention is a continuation-in-part of, was first described in and claims the benefit of U.S. Provisional Application No. 62/534,730 filed Jul. 20, 2017, the entire disclosures of which are incorporated herein by reference.

FIELD OF THE INVENTION

The present invention relates generally to the field of waste receptacle holding devices.

BACKGROUND OF THE INVENTION

One (1) of the many chores that plague a homeowner is the raking and subsequent removal of yard waste. This often back breaking work may be necessitated by lawn-clippings after mowing one's lawn or the collection and removal of fallen leaves in the autumn. Regardless of the type of lawn waste, removal of the yard waste is a chore most homeowners have come to dread.

Part of the reason the removal of yard waste is so difficult is due to the location of the waste being on the ground thereby requiring the homeowner to engage in repetitious and fatiguing acts of bending over and standing up coupled with the difficulty in keeping whatever waste receptacle bag the homeowner is using to dispose of the yard waste in an open configuration.

Many efforts have been made to address this problem by outfitting a bag holder to a handle such as U.S. Pat. Nos. 6,641,187, 5,997,061, U.S. Pat. App. Pub. No. 2006/0191542 and U.S. Pat. No. 7,011,278. However, these devices are unsatisfactory. As a result, there is a need for a waste receptacle holding device which easily secures a waste receptacle in an open configuration while employing a handle that is sturdy and long enough to allow a user to easily manipulate the device without unnecessary fatigue. The device of the instant application accomplishes this task.

SUMMARY OF THE INVENTION

The inventor has recognized the aforementioned inherent problems and lack in the art and observed that there is a need for a waste receptacle holding device.

It is therefore an object of the invention to provide a holding device, comprising a handle having a handle first end and a handle second end, a circular lower hoop secured to the handle second end, a circular upper hoop having a larger diameter than the lower hoop and secured to the handle second end adjacent the lower hoop with a hinge, an upper hoop retention clip secured to the handle adjacent the hinge and a waste bag retention clip secured to the upper hoop opposite the hinge. A waste receptacle is adaptably and removably secured in an open configuration to the device when positioned between the lower hoop and the upper hoop when the waste bag retention clip removably secures the lower hoop against the upper hoop. In a separate embodiment the upper hoop and lower hoop are ovular.

The waste bag retention clip may be "L"-shaped and may also comprise an aperture configured to permit the device to be suspended. The handle first end may comprise a male threaded portion. An end cap may threadingly be secured over the handle first end and may comprise plastic. A rake may threadingly be secured over the handle first end. The rake may comprise a handle, a ferrule disposed adjacent the handle and a plurality of tines disposed adjacent the ferrule opposite the handle. The lower hoop and upper hoop may either comprise stainless steel.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY 10 waste receptacle holding device
15 handle end cap
20 handle
25 upper hoop retention clip
27 tab
30 upper hoop first travel path
35 upper hoop second travel path
40 hinge
45 lower hoop
50 upper hoop
60 waste bag retention clip
62 hanging aperture
65 waste bag
66 rake head handle
67 handle aperture
68 female threaded region
70 rake head
72 ferrule
76 male threaded region
80 rake tine
100 alternate waste receptacle holding device
145 alternate lower hoop
150 alternate upper hoop

DETAILED DESCRIPTION OF THE PREFERRED EMBODIMENT

Figure 1:
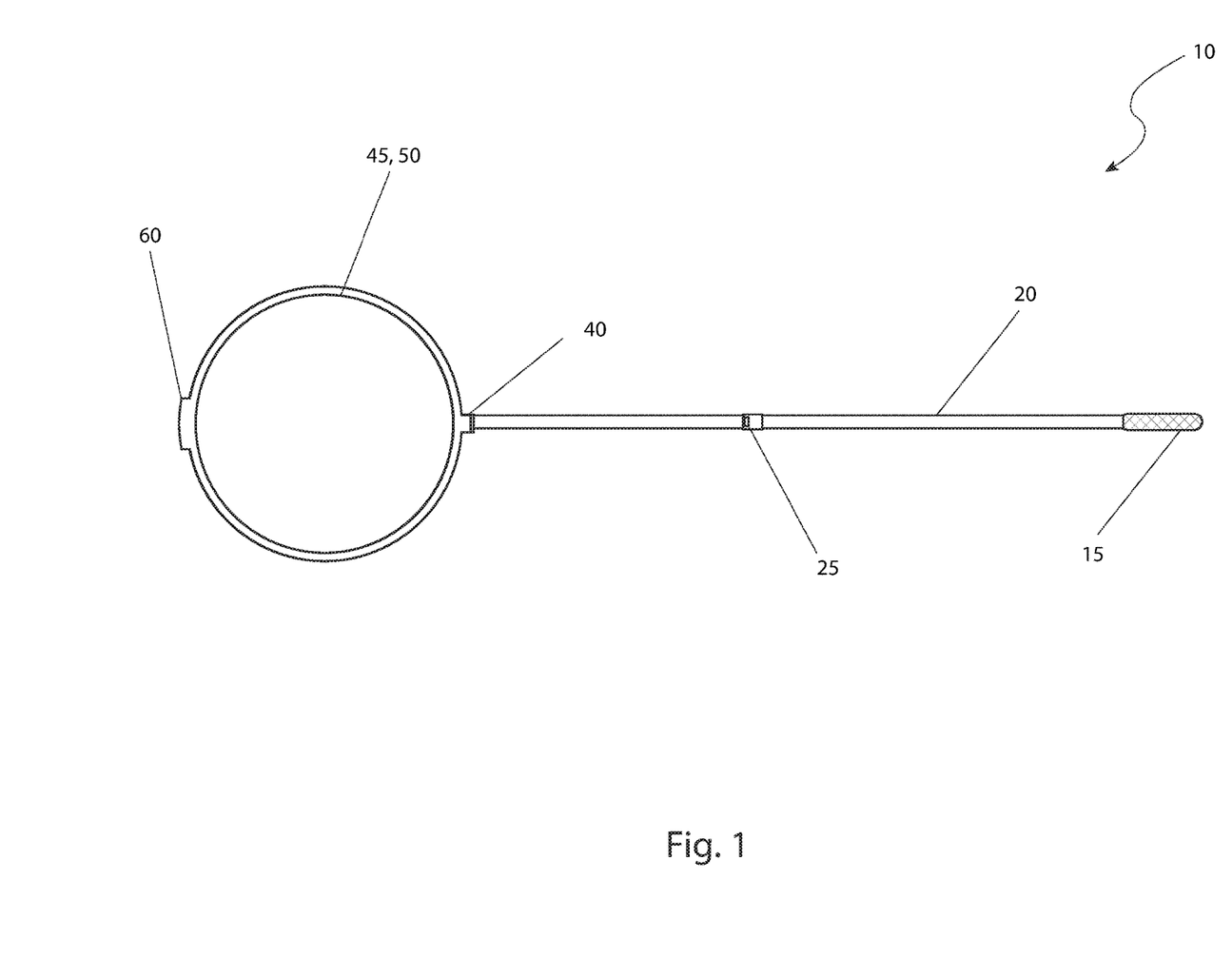
FIG. 1 is a top view of a waste receptacle holding device 10 in a closed configuration according to a preferred embodiment of the present invention.
Figure 2:
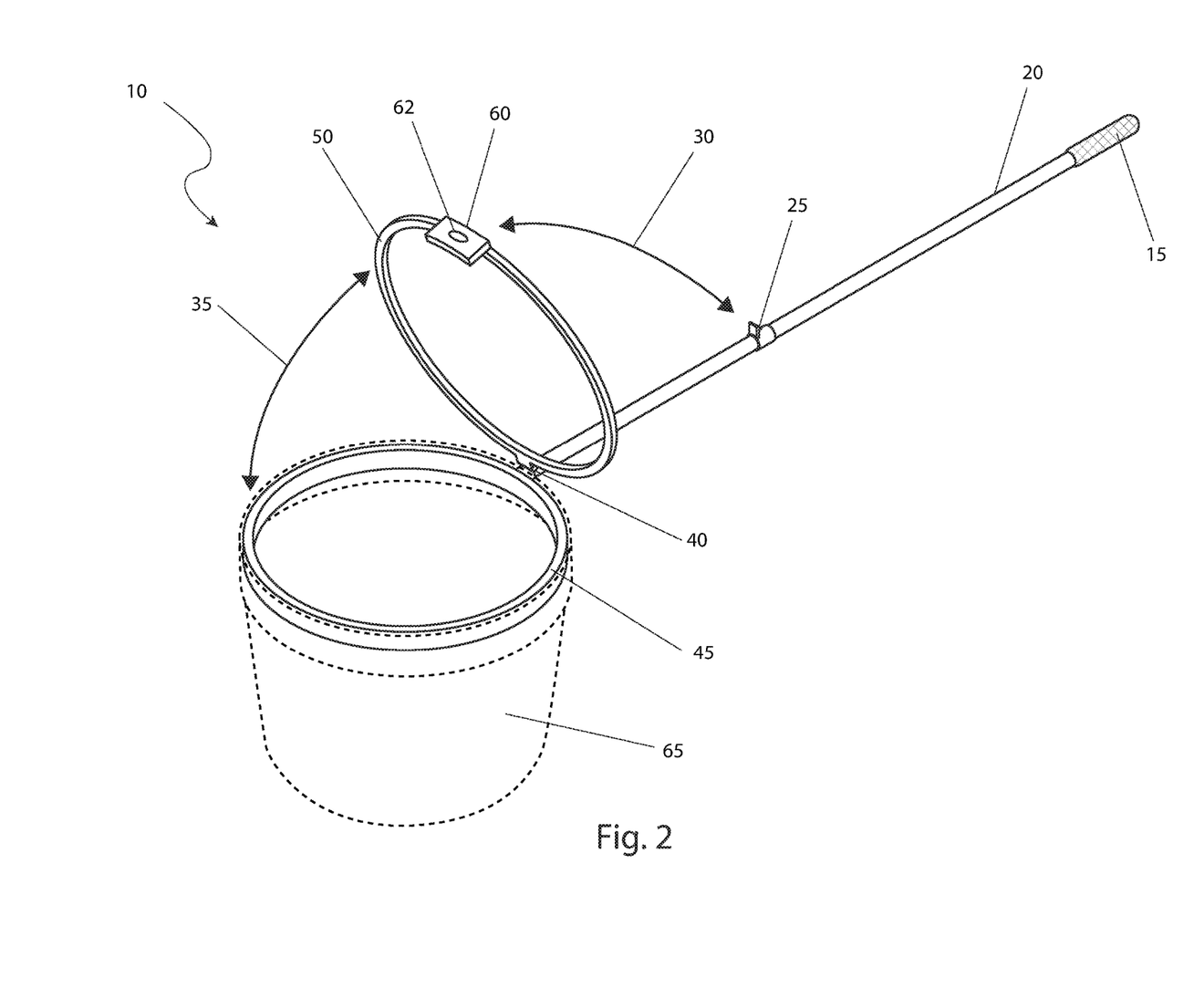
FIG. 2 is a perspective front view of the waste receptacle holding device 10 in a partially opened configuration, according to a preferred embodiment of the present invention.

The best mode for carrying out the invention is presented in terms of its preferred embodiment, herein depicted within FIGS. 1 and 2, and in terms of, alternate embodiments, herein depicted within FIGS. 3 through 6. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope.

The terms "a" and "an" herein do not denote a limitation of quantity, but rather denote the presence of at least one (1) of the referenced items.

Referring now to FIG. 1, a top view of a waste receptacle holding device 10, in a closed configuration according to a preferred embodiment of the present invention, is disclosed. The present invention describes a waste receptacle holding device (herein described as the "device") 10, which provides a handle 20, a lower loop 45, and an upper loop 50. In use, a purchased waste bag 65 is fitted about the lower hoop 45 and is secured by pivoting and latching the upper hoop 50. A user may then deposit yard debris or similar substances into the waste bag 65 while holding the handle 20.

The handle 20 is envisioned to be approximately six-and-one-half feet (6½ ft.) in length and provides a linear rod-shaped portion having a circular cross-sectional shape. The handle 20 includes an end cap 15, being threadingly attached upon a proximal end portion of the handle 20 via a male threaded region 76 (also see FIG. 4). An upper hoop 50 is pivotingly secured to a distal end portion of the handle 20 by a hinge 40. An upper hoop retention clip 25 is positioned intermediately along the handle 20 between the hinge 40 and the handle end cap 15. The upper hoop retention clip 25 provides a stationary cylindrical portion which wraps around the handle 20, and includes a protruding integral tab portion 27. To secure a waste bag 65 to the hoops 45, 50, the upper hoop 50 is pivoted from an open position about the hinge 40 until an "L"-shaped bag retention clip portion 60 of the upper hoop 50 opposite the hinge 40, engages and is secured via an interference fit with the tab portion 27 of the upper hoop retention clip portion 25.

Referring now to FIG. 2, a perspective front view of the device 10, in a partially opened configuration according to a preferred embodiment of the present invention, is disclosed. The lower hoop 45 is to have a slightly smaller diameter than the upper hoop 50 so as to effectively entrap edge portions of the waste bag 65 in between. The lower hoop 45 is integral to, or otherwise secured to, the distal end of the handle 20 at a point which shares a common plane with a diameter of the lower hoop 45. The upper hoop 50 is capable of hingedly moving along an upper hoop first travel path 30 which terminates at the upper hoop retention clip 25. The upper hoop retention clip 25 is capable of removably securing the waste bag retention clip portion 60 of the upper hoop 50. The upper hoop 50 is also capable of hingedly moving along an upper hoop second travel path 35 which terminates in the upper hoop 50 being removably secured about the lower hoop 45 via an interference fit with the bag retention clip 60.

In use, edge portions of an opening portion of the purchased waste bag 65 are fitted about the lower hoop 45 and subsequently secured when the upper hoop 50 is pivoted about the upper hoop second travel path 35 until contacting the lower hoop 45 in a parallel manner. The waste bag 65 is thereby secured all around the lower hoop 45 via the interference fit between the waste bag retention clip 60 and the lower hoop 45.

The end cap 15 is envisioned to be made of durable plastic or rubber. The lower hoop 45, upper hoop 50, hinge 40, upper hoop retention clip 25 and waste bag retention clip 60 are ideally manufactured from an oxidization resistant metal such as stainless steel; however, any metal commonly utilized in the manufacture of garden and yard tools may be employed. The lower hoop 45, upper hoop 50, hinge 40, upper hoop retention clip 25 and waste bag retention clip 60 may also be made of a durable plastic.

The end cap 15 is envisioned to be configured with a texturized surface for improved gripping by a user. An embodiment of the bag retention clip 60 is shown here providing a hanging aperture 62 suitable for hanging the device 10 from a storage hook or the like until needed.

Figure 3:
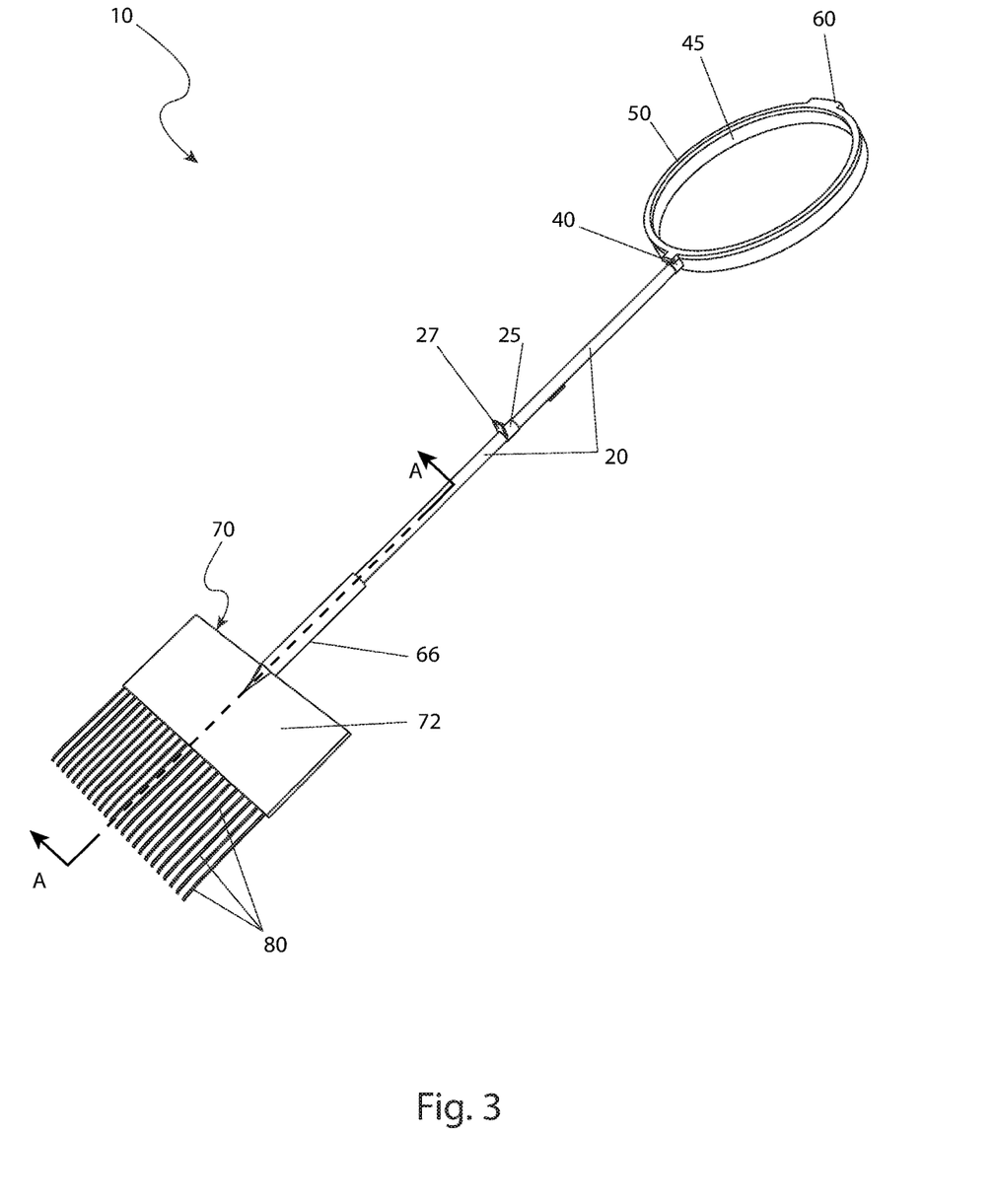
FIG. 3 is a perspective view of the waste receptacle holding device 10 depicting attachment of a rake head 70, according to an alternate embodiment of the present invention.

Referring now to FIG. 3, a perspective view of the device 10 depicting attachment of a rake head 70 to the device 10, according to an alternate embodiment of the present invention, is disclosed. The embodiment of the device 10 shown here provides a threadingly attached rake head portion 70 which includes a rake head handle 66 in place of the previously described handle end cap 15. The rake head 70 is envisioned to be approximately two-and-one-quarter feet (2¼ ft.) in width having a plurality of extending parallel rake tines 80. In addition to providing the aforementioned functions of the preferred embodiment 10 to collect and deposit yard debris into the waste bag 65, the attachment of the rake head 70 also allows a user to flip the device 10 over in an "end-to-end" fashion, and utilize the attached rake head 70 to perform a raking task while holding the handle 20.

Figure 4:
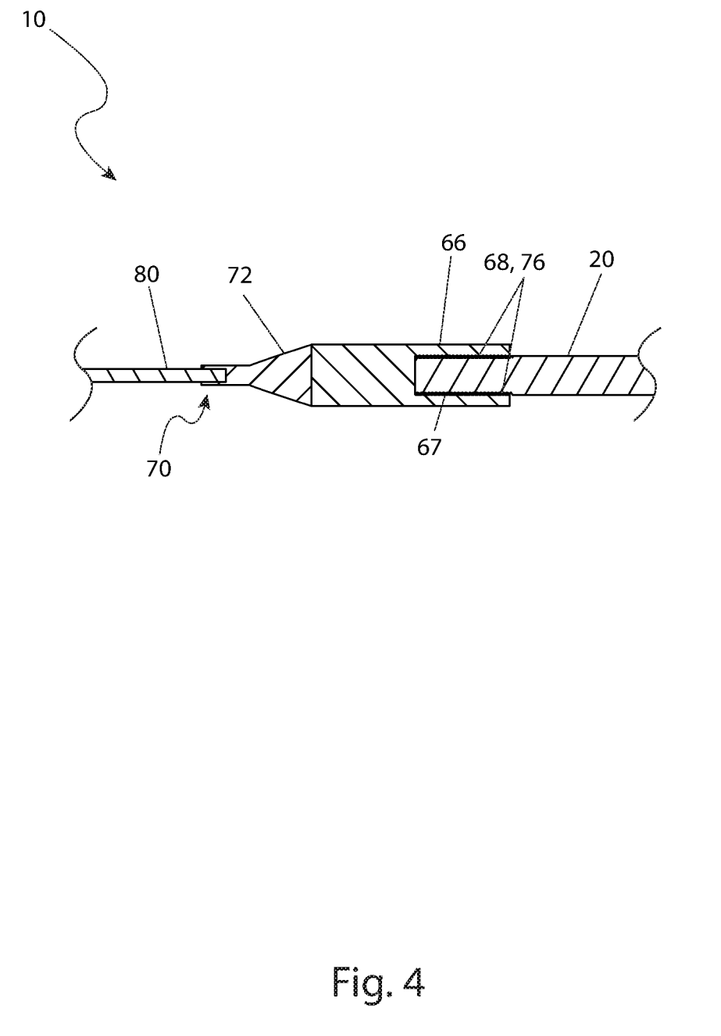
FIG. 4 is a sectional view of a rake head portion 70 taken along section line A-A (see FIG. 3), according to the alternate embodiment of the present invention.

Referring now to FIG. 4, a sectional view of the rake head 70 taken along section line A-A (see FIG. 3), according to the alternate embodiment of the present invention, is disclosed. The rake head 70 includes integral portions including a rake head handle 66 at one (1) end, and a ferrule 72 at the other end. The rake head handle 66 provides a cylindrical form approximately eight inches (8 in.) in length, which enables threaded removal and attachment of the rake head 70 to the handle 20. The rake head handle 66 includes a handle aperture 67 formed or machined within one (1) end, having an internal female threaded region 68 which threadingly engages a matching male threaded region portion 76 of the handle 20 upon threaded removal of the handle end cap 15. In this configuration, the device 10 may be used to perform a two-handed raking task in a conventional manner. Additionally, the rake head handle 66 may be threadingly disengaged from the handle 20 and the rake head 70 used separately if desired, using a one- or two-handed method to grip the rake head handle 66 and subsequently direct the yard debris directly into the waste bag 65 using the rake head 70.

The ferrule 72 provides a mounting means for a plurality of parallel rake tines 80. The ferrule 72 acts to retain the rake tines 80 via methods such as, but not limited to: molding, clamping, or a similar method of attachment.

Figure 5:
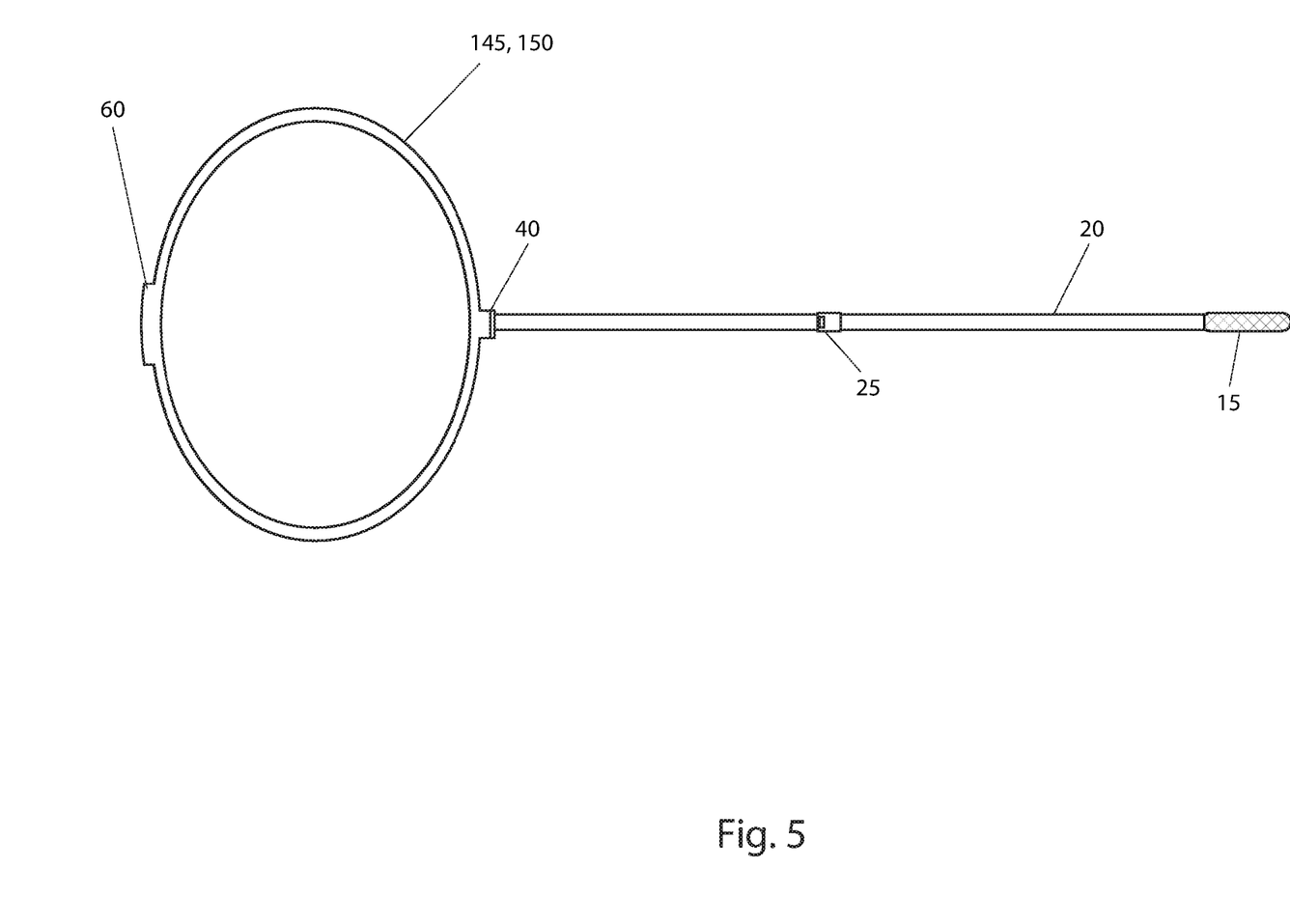
FIG. 5 is a top view of an alternate waste receptacle holding device 100 in a closed configuration, according to an alternate embodiment of the present invention; and, FIG. 6 is a perspective view of the alternate waste receptacle holding device 100, according to an alternate embodiment of the present invention.
Figure 6:
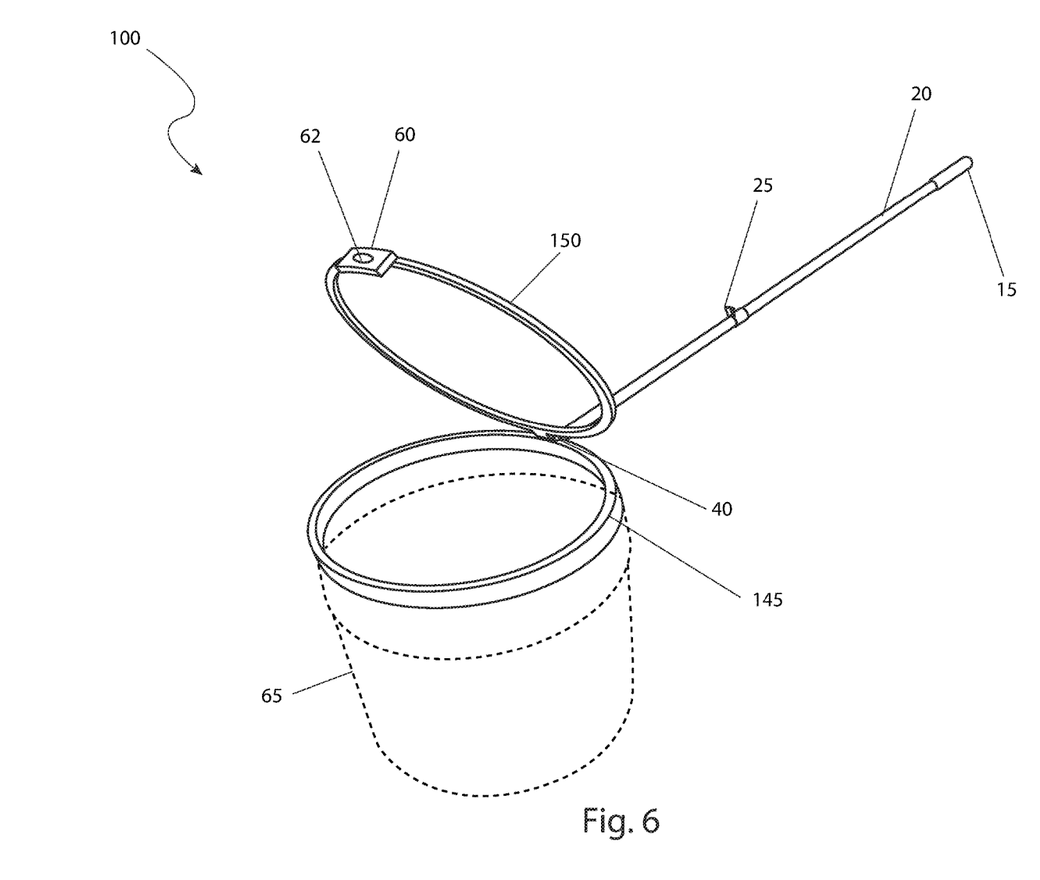

Referring now to FIGS. 5 and 6, top and perspective views of an alternate waste receptacle holding device 100, according to an alternate embodiment of the present invention, are disclosed. The alternate waste receptacle holding device 100 provides similar construction and functions as the previously described preferred embodiment of the device 10; however, the alternate waste receptacle holding device 100 includes elongated alternate lower hoop 145 and upper hoop 150 portions. The alternate lower hoop 145 and upper hoop 150 portions provide elliptical or oval-shaped forms having respective wider axis' being positioned perpendicular to the handle 20. The alternate lower hoop 145 and upper hoop 150 portions act to clamp the waste bag 65 in a similar fashion as the previously described lower hoop 45 and upper hoop 50 portions of the preferred embodiment 10, but jointly provide an elongated opening into which the yard waste may more easily pass through and enter the waste bag 65.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the device 10, it would be installed as indicated in FIG. 2.

The method of utilizing the device 10 may be achieved by performing the following steps: procuring the device 10; installing a waste bag 65 by draping the waste bag 65 over the lower hoop 45; securing the waste bag 65 to the lower hoop 45 by pivoting the upper hoop 50 through the upper hoop second travel path 35 until engaging the waste bag retention clip 60 to the lower hoop 45; depositing yard debris such as grass, leaves, twigs, or similar substances, into the waste bag 65 while grasping the handle 20, until the waste bag 65 is filled; releasing the waste bag retention clip 60 from the lower hoop 45; pivoting the upper hoop 50 upwardly through the upper hoop first travel path 30 until the waste bag retention clip 60 engages the upper hoop retention clip 25; removing and discarding the filled waste bag 65; repeating the above steps until the completion of a yard cleaning task; and, benefiting from a convenient and effective means to collect and dispose of lawn debris, afforded a user of the present invention 10.

The method of utilizing the alternate rake head 70 may be achieved by performing the following steps: procuring a model of the device 10 which includes the alternate rake head portion 70; utilizing the handle 20 and hoop portions 45, 50 to collect and deposit yard debris into the waste bag 65 as described above; rotating and threadingly removing the handle end cap 15 from the male threaded region 76 of the handle 20; attaching the rake head 70 to the handle 20 by fully engaging respective female threaded region 68 and male threaded region 76 portions; flipping the device 10 in an "end-to-end" fashion so as to position the rake head 70 toward a ground surface; and, utilizing the rake head 70 to perform a raking task while holding the handle 20. Additionally, the rake head handle 66 may be threadingly disengaged from the handle 20 and the rake head 70 used separately if desired, using a one- or two-handed method to grip the rake head handle 66 and direct the yard debris directly into the waste bag 65.

The method of utilizing the alternate waste receptacle holding device 100 may be achieved by performing the following steps: procuring a model of the device 10 having the alternate lower hoop 145 and upper hoop 150 portions; and, utilizing the elongated opening formed by the alternate hoops 145, 150 to reduce the effort required to load the yard waste into the waste bag 65.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A holding device, comprising:
   a handle having a handle first end and a handle second end;
   a circular lower hoop secured to said handle second end;
   a circular upper hoop having a larger diameter than said lower hoop and secured to said handle second end adjacent said lower hoop with a hinge;
   an upper hoop retention clip secured to said handle adjacent said hinge; and,
   a waste bag retention clip secured to said upper hoop opposite said hinge;
   a rake threadingly secured over said handle first end;
   wherein a waste receptacle is adaptably removably secured in an open configuration to said device when positioned between said lower hoop and said upper hoop and when said waste bag retention clip removably secures said lower hoop against said upper hoop;
   wherein said waste bag retention clip further comprises an aperture configured to permit said device to be suspended;
   wherein said rake comprises:
      a handle;
      a ferrule disposed adjacent said handle; and,
      a plurality of tines disposed adjacent said ferrule opposite said handle;
   wherein said lower hoop is made of stainless steel; and
   wherein said upper hoop is made of stainless steel.

2. The device of claim 1, wherein said waste bag retention clip is L-shaped.

3. The device of claim 1, wherein said handle first end comprises a male threaded portion.

4. The device of claim 3, further comprising an end cap threadingly secured over said handle first end.

5. The device of claim 4, wherein said end cap is made of plastic.

6. A holding device, comprising:
   a handle having a handle first end and a handle second end;
   an ovular lower hoop secured to said handle second end;
   an ovular upper hoop having a larger diameter than said lower hoop and secured to said handle second end adjacent said lower hoop with a hinge;
   an upper hoop retention clip secured to said handle adjacent said hinge; and,
   a waste bag retention clip secured to said upper hoop opposite said hinge;
   a rake threadingly secured over said handle first end;
   wherein a waste receptacle is adaptably removably secured in an open configuration to said device when positioned between said lower hoop and said upper hoop and when said waste bag retention clip removably secures said lower hoop against said upper hoop;
   wherein said waste bag retention clip further comprises an aperture configured to permit said device to be suspended;
   wherein said rake comprises:
      a handle;
      a ferrule disposed adjacent said handle; and,
      a plurality of tines disposed adjacent said ferrule opposite said handle;
   wherein said lower hoop is made of stainless steel; and
   wherein said upper hoop is made of stainless steel.

7. The device of claim 6, wherein said waste bag retention clip is L-shaped.

8. The device of claim 6, wherein said handle first end comprises a male threaded portion.

9. The device of claim 8, further comprising an end cap threadingly secured over said handle first end.

10. The device of claim 9, wherein said end cap is made of plastic.

* * * * *